(12) United States Patent
Nelson

(10) Patent No.: US 8,032,976 B2
(45) Date of Patent: Oct. 11, 2011

(54) WIPER WITH ROTATING CLEANING APPARATUS

(75) Inventor: James Q. Nelson, Salt Lake City, UT (US)

(73) Assignee: Nelson and Nelson Enterprises, LLC, Salt Lake City, UT (US)

( * ) Notice: Subject to any disclaimer, the term of this patent is extended or adjusted under 35 U.S.C. 154(b) by 335 days.

(21) Appl. No.: 12/248,732

(22) Filed: Oct. 9, 2008

(65) Prior Publication Data

US 2010/0089417 A1 Apr. 15, 2010

(51) Int. Cl.
| | |
|---|---|
| B60S 1/52 | (2006.01) |
| B60S 1/46 | (2006.01) |
| B60S 1/28 | (2006.01) |
| B60S 1/12 | (2006.01) |

(52) U.S. Cl. ............... 15/250.04; 15/250.41; 15/250.22
(58) Field of Classification Search ............... 15/250.04, 15/250.001, 250.11, 250.41, 250.4, 250.22, 15/103
See application file for complete search history.

(56) References Cited

U.S. PATENT DOCUMENTS

| | | | |
|---|---|---|---|
| 1,197,763 A | 9/1916 | Plotnitzky | |
| 2,289,545 A | 4/1940 | Horton et al. | |
| 2,648,087 A | 8/1953 | Kiker, Jr. | |
| 2,712,148 A | 7/1955 | Cheshire | |
| 2,719,994 A | 10/1955 | Dorsey | |
| 2,784,437 A | 3/1957 | Haas | |
| 2,787,803 A | 4/1957 | Cella | |
| 3,080,592 A * | 3/1963 | Hassage | 15/98 |
| 3,422,484 A * | 1/1969 | Carpenter | 15/250.04 |
| 3,790,083 A * | 2/1974 | Redifer | 239/284.1 |
| 3,887,955 A | 6/1975 | Jarvinen | |
| 3,892,006 A | 7/1975 | Yasumoto | |
| 3,906,583 A | 9/1975 | Murphy | |
| 3,939,524 A | 2/1976 | Knights | |
| 4,019,216 A | 4/1977 | Priesemuth | |
| D257,339 S | 10/1980 | Ellinwood | |
| 4,342,129 A | 8/1982 | Thompson | |
| 4,567,621 A | 2/1986 | Alley, Jr. | |
| 4,611,364 A | 9/1986 | Grubner | |
| 4,649,593 A | 3/1987 | Gilliam, III et al. | |

(Continued)

FOREIGN PATENT DOCUMENTS

DE 2700527 9/1978

(Continued)

OTHER PUBLICATIONS

U.S. Appl. No. 13/044,132, Mail Date Jun. 16, 2011, Office Action.

Primary Examiner — Gary Graham
(74) Attorney, Agent, or Firm — Workman Nydegger

(57) ABSTRACT

A windshield wiper includes a scrubbing assembly attached to a wiper assembly. The wiper assembly includes a wiper blade attached to a wiper housing. The scrubbing assembly includes a scrubbing element having a central longitudinal axis and one or more turbines attached to the scrubbing element, the turbine(s) being configured to fluidly couple with a washer fluid line of a vehicle and to rotate the scrubbing element about the central longitudinal axis when wiper fluid flows through the turbine(s). The wiper fluid may be deposited on the scrubbing element after flowing through the turbine(s) and the scrubbing assembly can also include a shield. The scrubbing assembly can be rigidly secured to the wiper assembly or can be detachable therefrom.

21 Claims, 14 Drawing Sheets

U.S. PATENT DOCUMENTS

| | | | |
|---|---|---|---|
| 4,719,661 A | 1/1988 | Hanselmann | |
| 4,745,653 A | 5/1988 | Bliznak | |
| 4,754,517 A | 7/1988 | Aldous | |
| 5,235,720 A | 8/1993 | Kinder | |
| 5,255,407 A | 10/1993 | Yang | |
| 5,301,384 A | 4/1994 | Perry | |
| 5,323,508 A * | 6/1994 | Sheldrake | 15/250.22 |
| D349,082 S | 7/1994 | Brabender | |
| 5,406,672 A | 4/1995 | Hipke | |
| 5,442,834 A | 8/1995 | Perry | |
| 5,634,841 A | 6/1997 | Gold | |
| 5,778,483 A | 7/1998 | Dawson | |
| 5,996,168 A | 12/1999 | Watkins | |
| 6,279,193 B1 | 8/2001 | Cheng | |
| 6,505,378 B1 | 1/2003 | Squires | |
| D469,731 S | 2/2003 | Geer | |
| 6,687,946 B2 | 2/2004 | Reddoch | |
| 6,748,621 B1 | 6/2004 | Root | |
| 6,763,546 B1 | 7/2004 | Smith | |
| 7,334,288 B2 | 2/2008 | Rudd et al. | |
| 7,503,091 B2 * | 3/2009 | White et al. | 15/103 |
| 2002/0773493 | 6/2002 | Walton | |
| 2002/0092114 A1 | 7/2002 | Reddoch | |
| 2002/0129458 A1 | 9/2002 | Hsieh | |
| 2003/0229960 A1 | 12/2003 | Stouder | |
| 2006/0000044 A1 | 1/2006 | de La Pena Razquin | |
| 2007/0017055 A1 | 1/2007 | Simko | |
| 2007/0044259 A1 * | 3/2007 | White et al. | 15/103 |
| 2007/0094831 A1 | 5/2007 | Huguley | |

FOREIGN PATENT DOCUMENTS

| | | |
|---|---|---|
| DE | 3934460 | 8/1990 |
| GB | 2201585 | 9/1988 |
| GB | 2267816 | 12/1993 |
| JP | 9-76881 * | 3/1997 |
| WO | WO 83/02756 | 8/1983 |
| WO | WO 89/00396 | 1/1989 |
| WO | WO 93/09979 | 5/1993 |

* cited by examiner

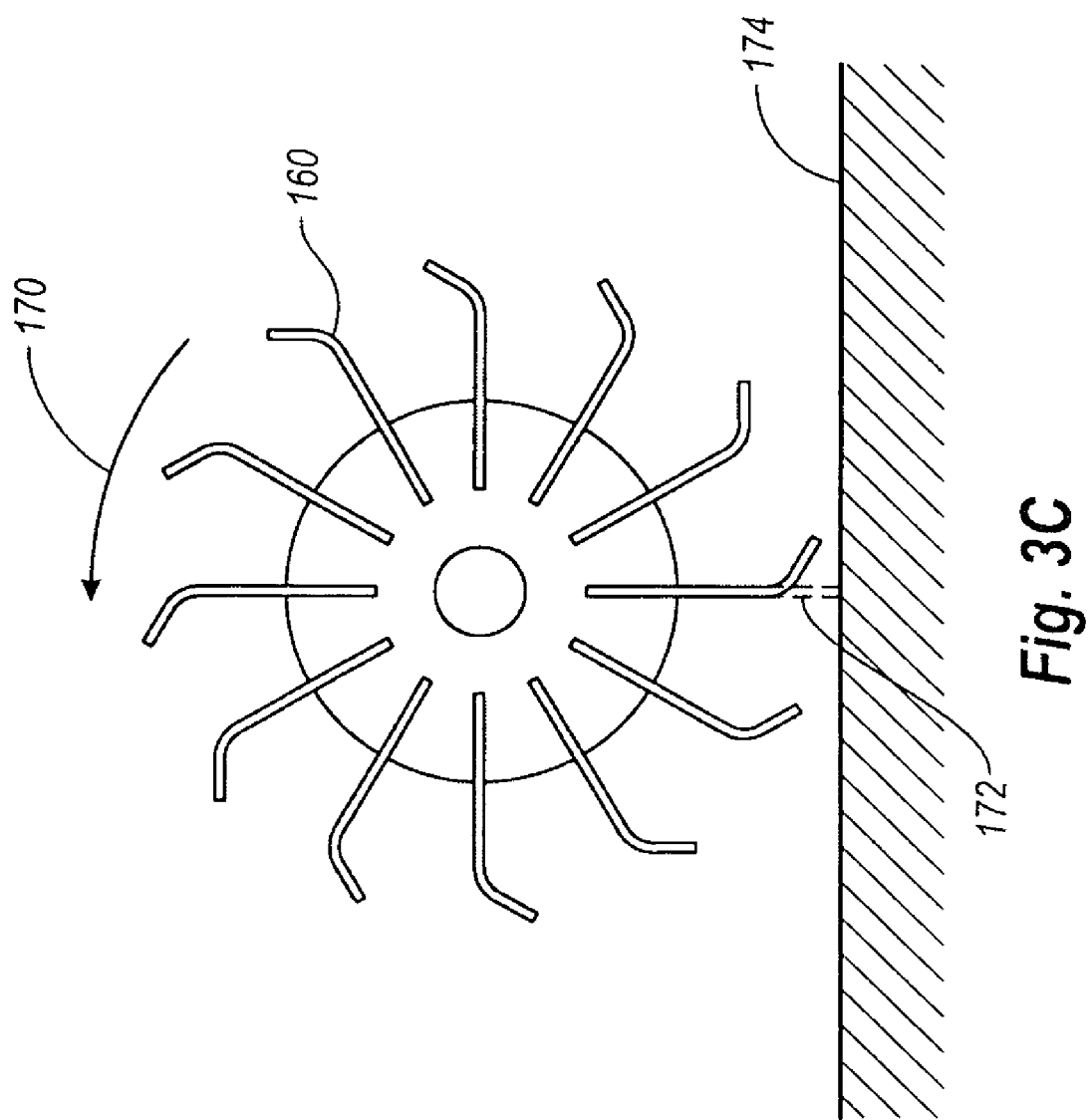

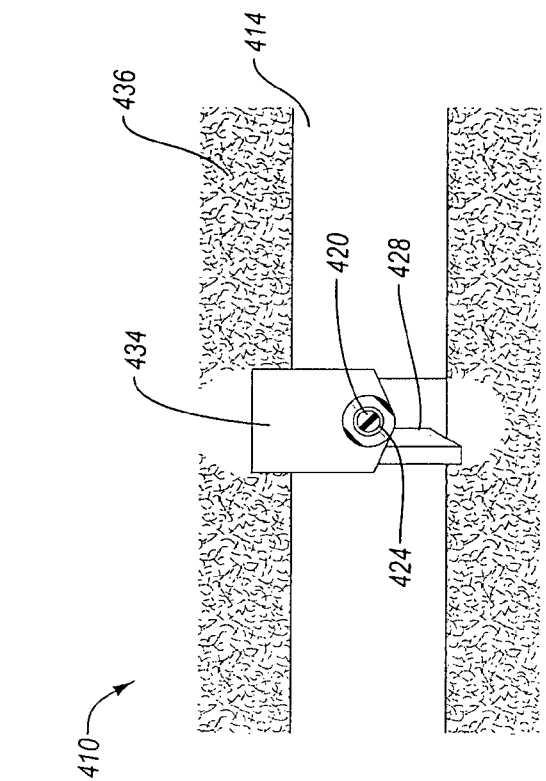
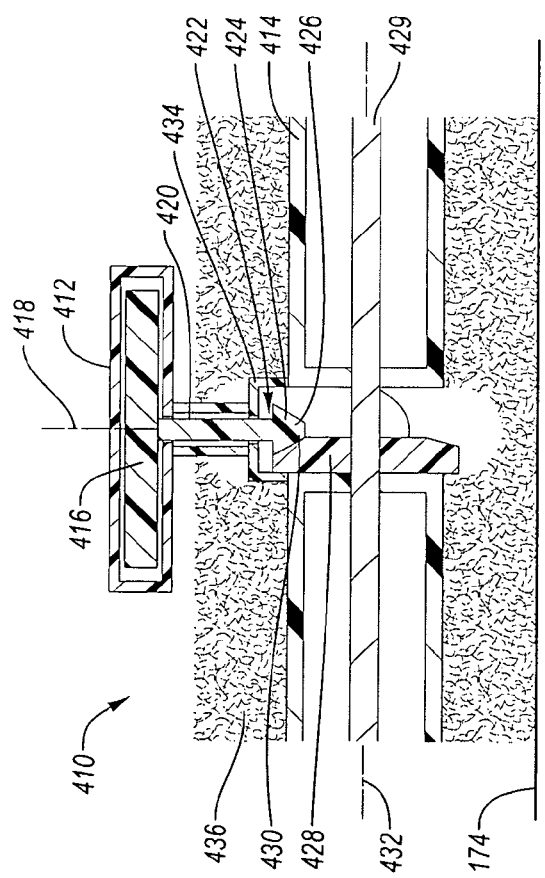

WIPER WITH ROTATING CLEANING APPARATUS

CROSS-REFERENCE TO RELATED APPLICATIONS

Not Applicable.

BACKGROUND OF THE INVENTION

1. The Field of the Invention

The present invention relates to wipers having a wiper blade and an additional rotating scrubber element attached thereto. The invention also relates to scrubber elements selectively rotatable by hydraulic means such as turbines that can be attached to conventional wipers.

2. The Relevant Technology

Almost all motor vehicles sold today come with a standard set of windshield wipers. These wipers typically include a wiper blade made of rubber or the like, which is attached to a wiper housing so as to contact the windshield surface. The wiper housing is attached to a wiper arm extending from the motor vehicle. During use, the wiper arm causes the wiper housing to move back and forth across the windshield. This causes the wiper blade to push the rain, snow, or other debris away from the forward field of view of the driver. This, of course, is necessary so the driver can see the road ahead while driving during inclement weather. When the windshield becomes dirty while there is no precipitation, the driver can activate a washer pump that causes washer fluid to flow through a fluid line and spray onto the windshield to help the wipers remove the debris.

If the view through the windshield becomes blocked or even obscured for whatever reason, it can impact the driver's view and create a dangerous situation. This can occur, for example, when the wiper stops working or when the wiper blades become worn. It can also occur when something hits the windshield that the wiper is not able to remove, even when using washer fluid. The latter can occur, for example, when a car passes through a swarm of insects that splatter all over the windshield.

To aid in these situations, various after-market wipers have been designed that can replace stock wipers that come with the vehicle. These replacement wipers include scrubbing pads designed to scrub the windshield as the wiper passes back and forth over the windshield. The scrubbing pads help remove the foreign matter from the windshield, but they have significant disadvantages. For example, the scrubbing pads tend to wear out quickly and need to be replaced often. This can be very expensive. Furthermore, dry scrubbing pads can actually further obscure the view through the windshield by smearing the foreign matter further on the windshield. While the windshield washer fluid can be energized to wet the window, this only partially helps.

To help in the scrubbing action, various wipers have been designed to include a motor that can rotate or otherwise move the scrubber. While this can improve the scrubbing action, the scrubber can still wear out quickly. Furthermore, the motor must have electrical wires run to it. As a result, when replacing the original wipers a technician or other qualified person must modify the automobile to position and run the wires to the new wiper, which can be expensive and time consuming. The cost of the motor can also cause the wipers to be relatively expensive.

Accordingly, what is needed are wipers that can provide more scrubbing action for hard to remove debris and that can easily replace standard wipers but that will not wear out quickly and do not require much installation expertise.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope. In the drawings, like parts are given like reference numerals.

FIGS. 3A-3C show side plan views of various embodiments of scrubbing members that can be used with the scrubbing element shown in FIG. 2;

FIG. 12 is a partial cross-sectional side view of a scrubbing assembly according to another embodiment of the present invention;

FIG. 13 is a partial cross-sectional top view of the scrubbing assembly shown in FIG. 12.

DETAILED DESCRIPTION OF THE PREFERRED EMBODIMENTS

Figure 1:
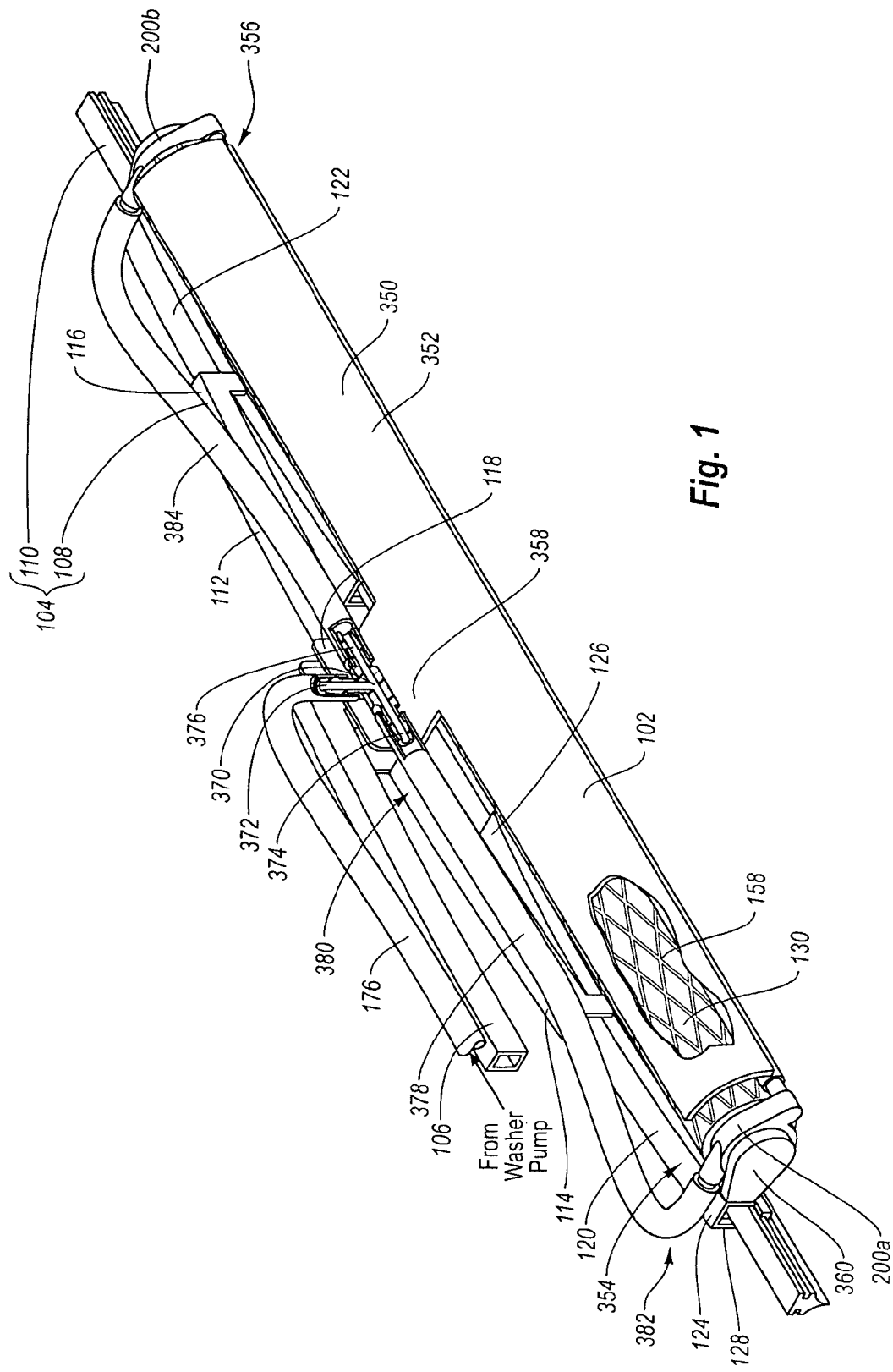
FIG. 1 is a front perspective view of a wiper which includes a scrubbing assembly according to one embodiment of the present invention.

Depicted in FIG. 1 is one embodiment of a wiper 100 incorporating features of the present invention. Wiper 100 comprises a scrubbing assembly 102 attached to or formed with a windshield wiper assembly 104 of the type generally known within the art and configured to attach to a wiper arm 106 of a vehicle.

As shown in FIG. 1, windshield wiper assembly 104 comprises a wiper housing 108 having a wiper blade 110 attached thereto. Wiper housing 108 has an articulated main crossmember 112 extending between a first end 114 and a spaced apart second end 116. Main cross member 112 also includes a center section 118 that is configured to attach to the vehicle's wiper arm 106, as is known in the art. A washer fluid line 176 typically extends down wiper arm 106 from the vehicle to spray washer fluid onto the windshield. Wiper housing 108 also includes a pair of cross arms 120, 122, flexibly attached to first and second ends 114, 116 of cross member 112. Each cross arm 120, 122 extends between a first end 124 and a spaced apart second end 126 with a mounting bracket 128 being formed at each end 124, 126 of each cross arm 120, 122.

Wiper housing 108 is configured such that all of the mounting brackets 128 are aligned. Other configurations of wiper housing 108, as are known in the art, can also be used.

Wiper blade 110 is a thin, typically rubber blade that is received within mounting brackets 128 so as to face the windshield of a vehicle and contact the windshield when the wiper assembly 104 has been installed. Virtually any wiper blade known in the art can be used with the present invention.

As shown in FIG. 1 and described in detail below, scrubbing assembly 102 comprises a scrubbing element 130 that is rotated by one or more turbines 200 that are attached to or formed with windshield wiper assembly 104.

Figure 2:
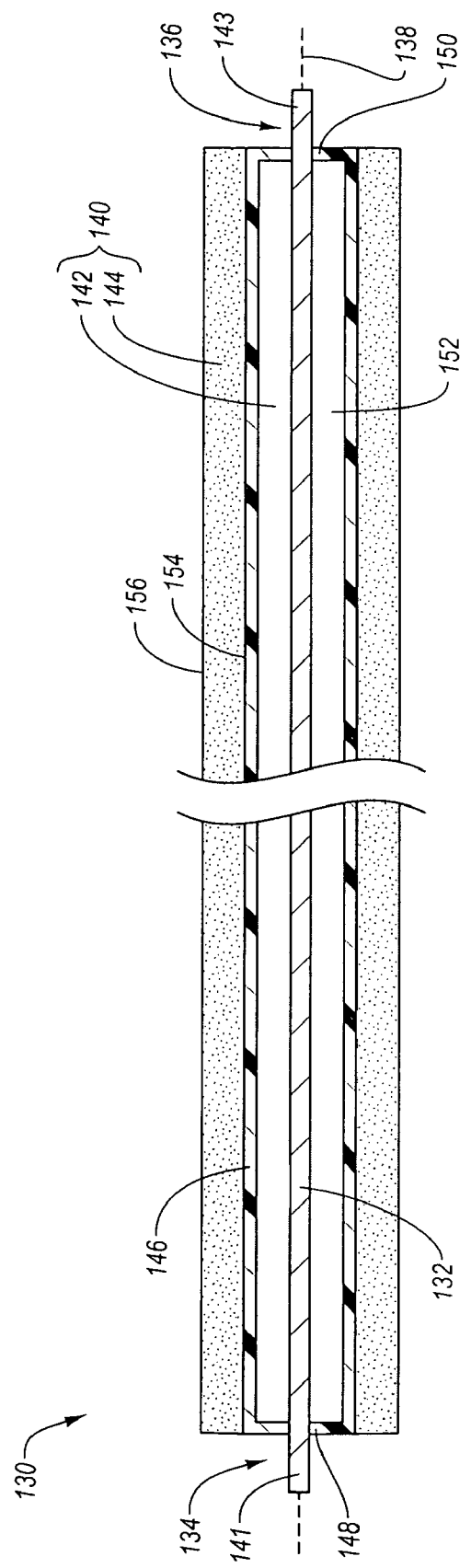
FIG. 2 is a cross-sectional top view of the scrubbing element shown in FIG. 1.

Turning to FIG. 2, scrubbing element 130 has a core 132 extending between a first end 134 and a spaced apart second end 136 along a central longitudinal axis 138. Core 132 is generally in the form of an elongated rod having a substantially circular or other cross sectional shape. First ends 134 and 136 of core 132 can have cross-sectional shapes that are symmetrical or non symmetrical so as to form a shaft of a turbine, as discussed in more detail below. Possible cross-sectional shapes include circular, oval, square, star shaped, or other symmetrical or non-symmetrical shapes. Other rod shapes known in the art can also be used. Core 132 can be made of hard plastic, metal, or other material.

Scrubbing element 130 further comprises a scrubbing member 140 that radially outwardly extends from core 132. Scrubbing member 140 radially surrounds core 132 between first and second ends 134, 136. Scrubbing member 140 is disposed such that small portions 141 and 143 of core 132 at both the first and second ends 134, 136 extend longitudinally past scrubbing member 140 so as to be freely exposed. As shown in FIG. 2, scrubbing member 140 includes an inner portion 142 which is formed about or attached to core 132 and an outer portion 144 which contacts the windshield and performs the scrubbing action.

Inner portion 142 is generally in the form of a cylinder comprising an outer wall 146 that encircles core 132 between first and second ends 134, 136. Extending inward (towards core 132) from outer wall 146 at first and second ends 134, 136 is a pair of radial walls 148, 150, which rigidly attach to core 132. Outer wall 146 and radial walls 148, 150 together bound a hollow cavity 152. In the depicted embodiment, inner portion 142 attaches to core 132 only at first and second ends 134, 136. If desired, further radial walls can be spaced apart within cavity 152 to attach outer wall 146 to core 132 along the length of core 132. In other embodiments, inner portion 142 is a solid mass from outer wall 146 to core 132, such that cavity 152 is smaller or altogether gone. In such embodiments inner portion 142 can be attached to core 132 along the entire length of inner portion 142. Outer wall 146 and radial walls 148, 150 are made of hard plastic, metal, or other material. In some embodiments inner portion 142 is made of the same material as core 132. In an alternative embodiment, inner portion 142 is integrally formed with core 132 instead of being attached to core 132.

With continued reference to FIG. 2, outer portion 144 outwardly extends from inner portion 142 and is configured to perform the scrubbing action on the windshield. In the depicted embodiment, outer portion 144 comprises an inner surface 154 that is attached to or formed with outer wall 146 of inner portion 142 and an opposing outer surface 156 that performs the scrubbing action on the windshield. Outer portion 144 is made of a material that can perform the scrubbing action without damaging the windshield. For example, outer portion 144 can comprise a foam pad, a chamois, a cloth or the like. A mesh netting 158 made of plastic, nylon, cloth or the like can cover or otherwise be positioned within outer portion 144, as shown in FIG. 1, to aid in the scrubbing action. Outer portion 144 is attached to inner portion 142 by glue, epoxy, or other type of adhesive or fastener.

Figure 3B:
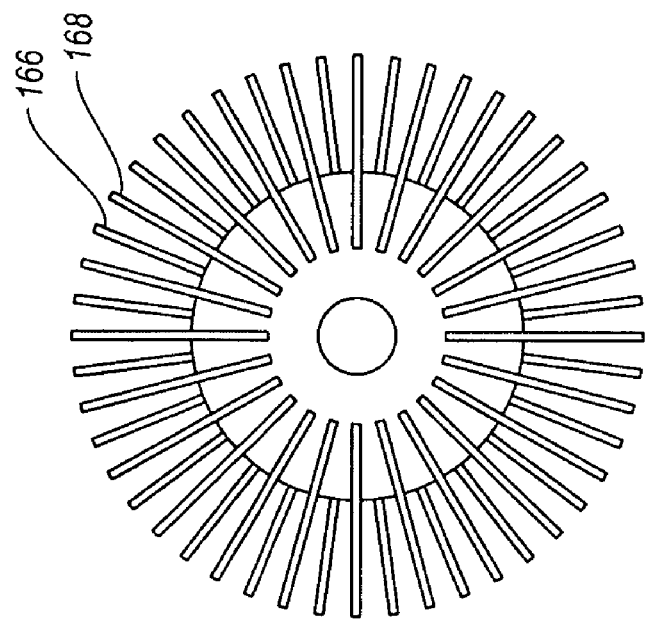
Figure 3A:
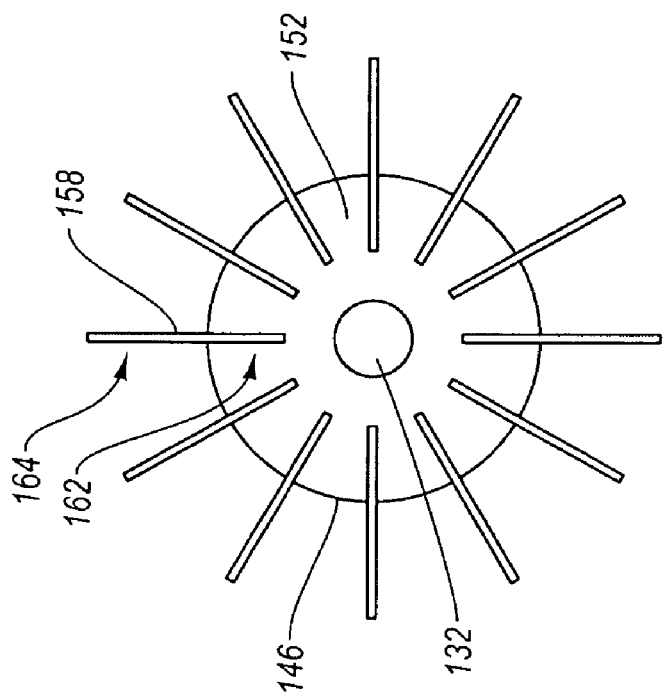

In alternative embodiments, bristles can be used in place of or in conjunction with foam pads, chamois, cloths or the like to perform the scrubbing action on the windshield. For example, FIGS. 3A-3C depict various arrangements of bristles that can be used as the outer portion 144 of scrubbing member 140. In FIG. 3A, outer portion 144 comprises a plurality of bristles 160 each radially extending from a first end 162 disposed within cavity 152 of inner portion 142 to a spaced apart second end 164 freely disposed away from core 132. Bristles 160 are radially spaced apart and extend through outer wall 146 of inner portion 142. FIG. 3B shows an alternative embodiment in which shorter bristles 166 which connect to outer wall 146 are intermixed with the longer bristles 160 that extend through outer wall 146.

FIG. 3C shows an alternative embodiment similar to that shown in FIG. 3A. However, where bristles 160 are substantially straight, bristles 168 are substantially U or J-shaped at second end 164. In this embodiment, when scrubbing element 130 is rotated in the direction shown by arrow 170, centripetal force causes bristles 168 to straighten out as shown by broken lines at 172. This results in bristles 168 extending further radially outward when scrubbing element 130 is rotating. As a result, scrubbing element 130 can be positioned so that bristles 168 only contact windshield 174 of the vehicle when scrubbing element 130 is rotating.

Bristles 160, 166, 168 can be made of nylon, plastic or other material known in the art. It is appreciated that other arrangements can also be used for the scrubbing element 130. For example, bristles can also be intermingled with a foam pad, a mesh netting, a chamois, a cloth or the like.

Scrubbing element 130 is designed to rotate about its longitudinal axis 138 (FIG. 2) to provide a better and more uniform scrubbing action. To accomplish this, scrubbing element 130 is attached to one or more turbines that convert fluid flow into rotational motion. For example, returning to FIG. 1, a pair of turbines 200a, 200b are attached to scrubbing element 130, one at each end thereof. In other embodiments only one turbine is used, (see, e.g., FIG. 10). It is noted that each turbine 200a, 200b is substantially the same except for being a mirror image of each other. In light of this, although the below discussion refers to turbine 200, it can be applied to either turbine 200a or 200b.

Furthermore, although the discussion below and the accompanying drawings correspond to a Pelton type of turbine 200, it is appreciated that other types of turbine arrangements can alternatively be used. By way of example, a Francis type of turbine can alternatively be used. Other types of turbines can also be used.

Figure 4:
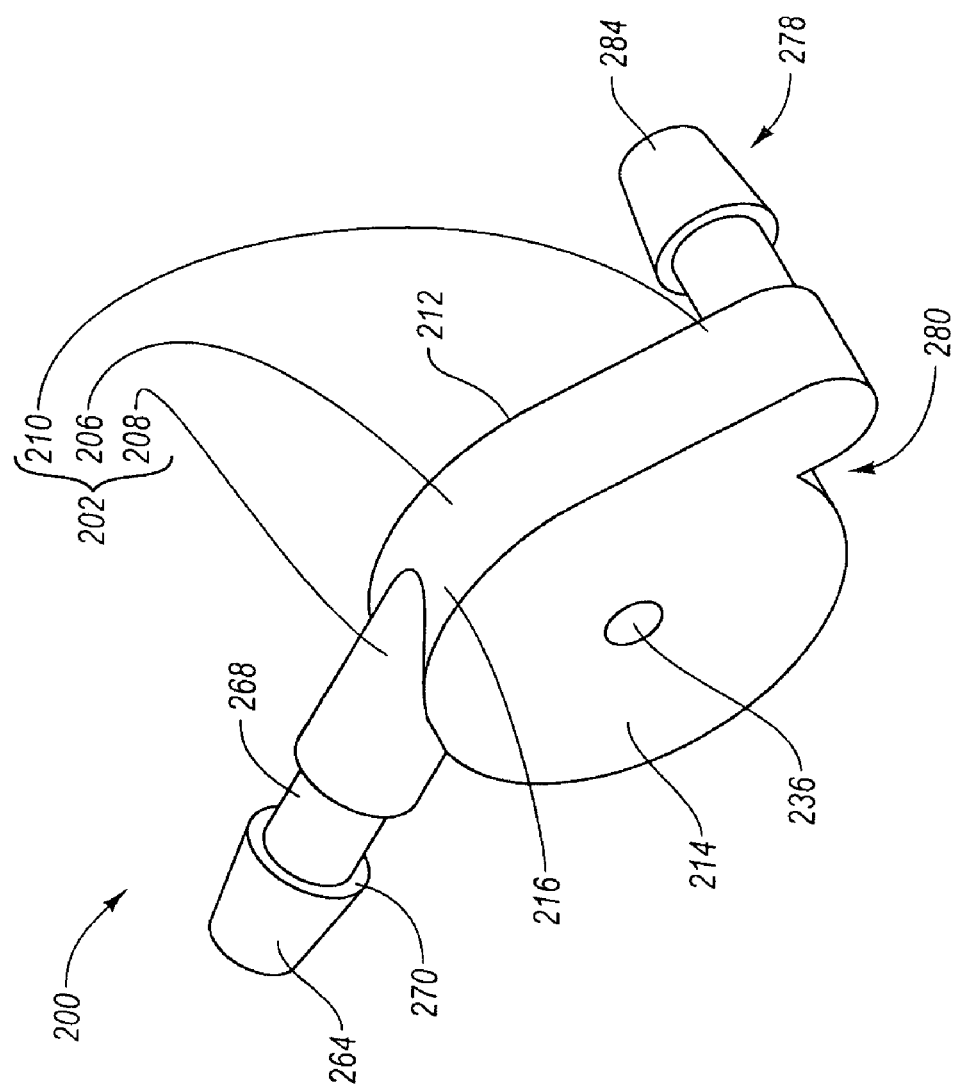
FIG. 4 is a perspective view of the turbine shown in FIG. 1.
Figure 5:
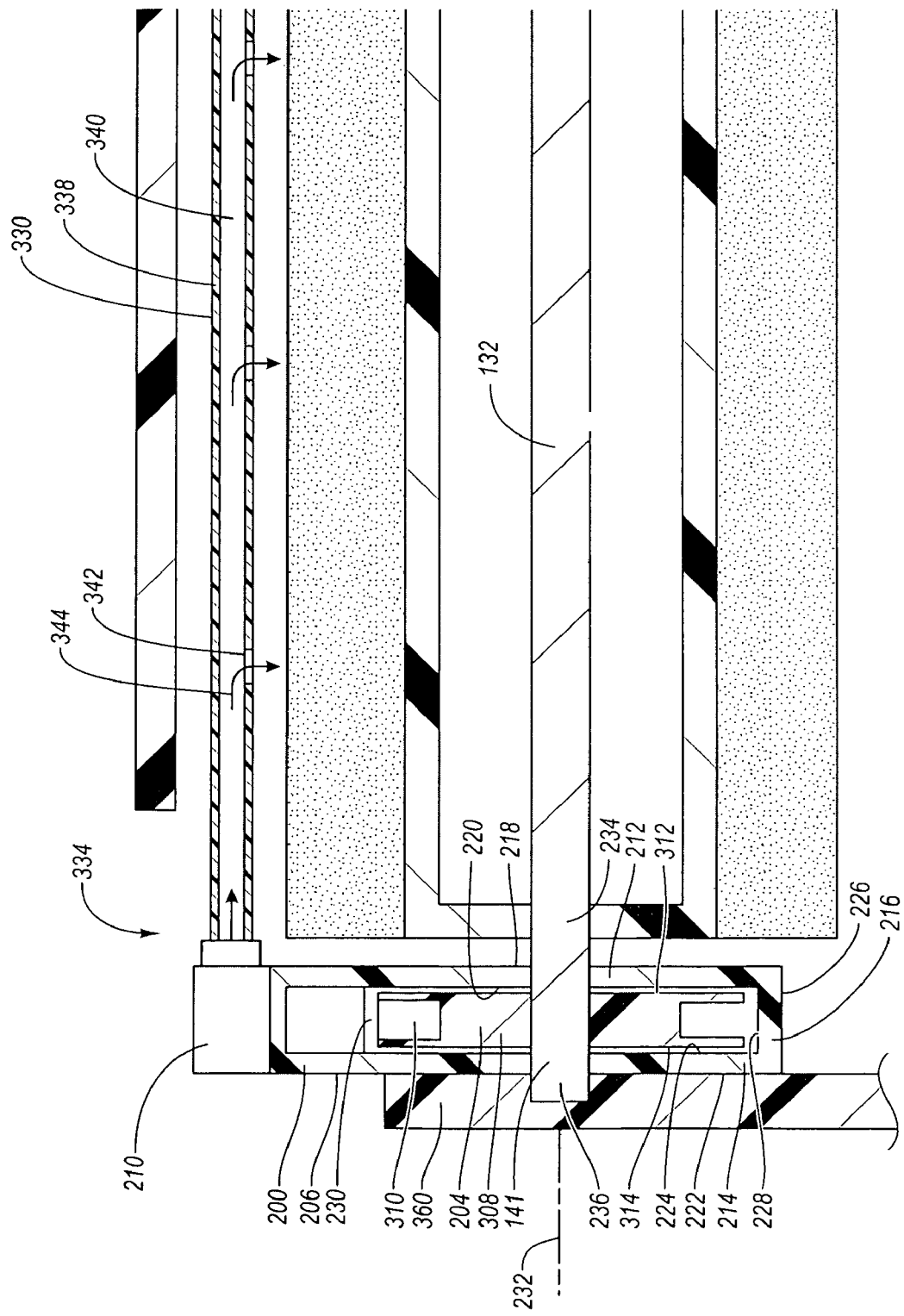
FIG. 5 is a cross-sectional top view of a portion of the scrubbing assembly shown in FIG. 1.
Figure 6:
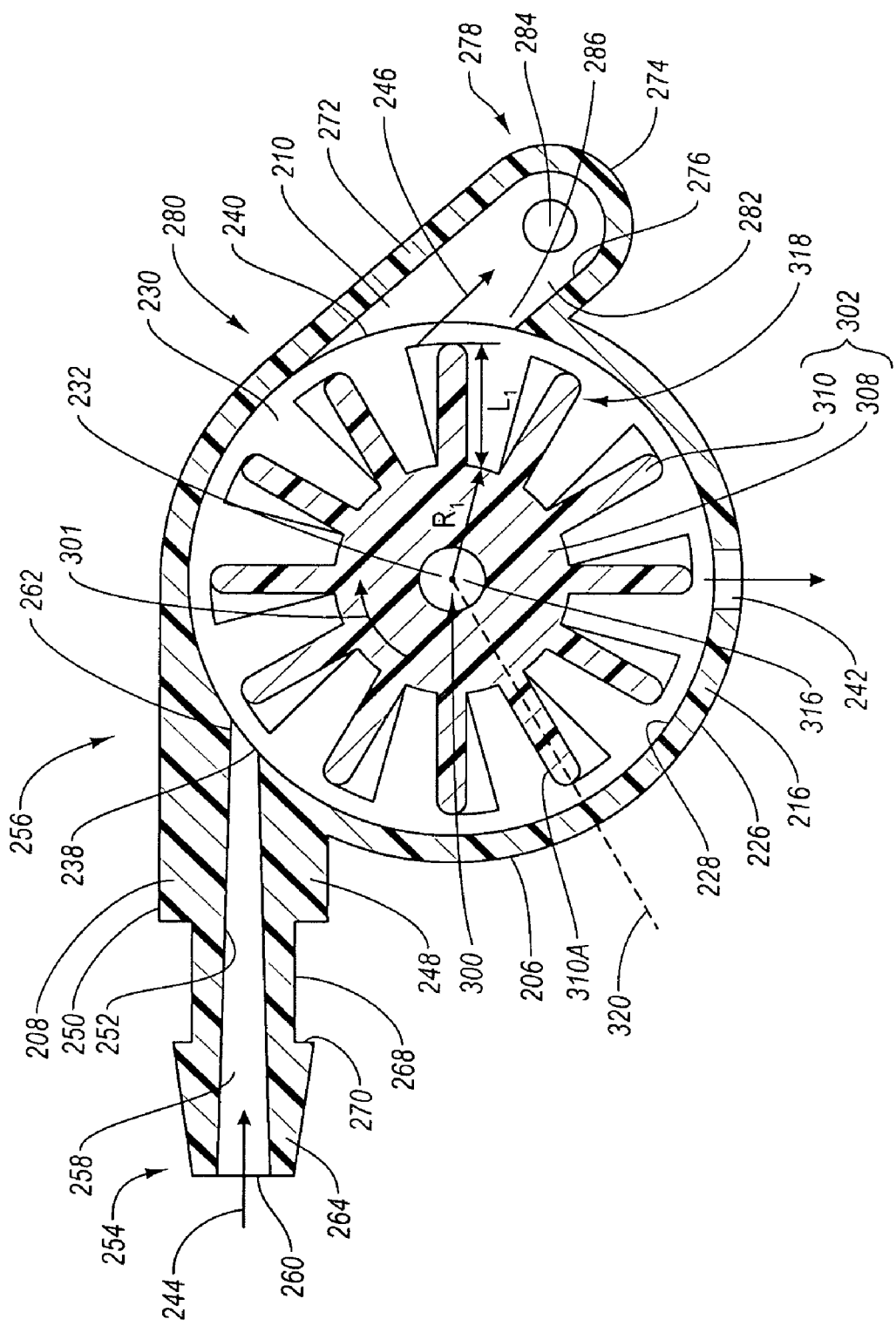
FIG. 6 is a cross-sectional side view of the turbine shown in FIG. 4.

Turning to FIGS. 4-6, turbine 200 comprises a housing 202 with a rotor assembly 204 disposed therein. Housing 202 comprises a casing 206 having a fluid inlet 208 and a fluid outlet 210 extending therefrom. Casing 206 comprises a generally circular first side wall 212 and an opposing generally circular second side wall 214 with a perimeter wall 216 extending therebetween. As particularly shown in FIG. 5, side walls 212, 214 are generally coplanar so that casing 206 generally forms a cylinder. Side wall 212 has an exterior surface 218 and an opposing interior surface 220. Similarly, side wall 214 has an exterior surface 222 and an opposing interior surface 224. Interior surfaces 220 and 224 face each other. Perimeter wall 216 also has an exterior surface 226 and an opposing interior surface 228.

The interior surfaces 220, 224, 228 of side walls 212, 214 and perimeter wall 216 together bound a generally cylindrical chamber 230 within casing 206 having a center axis 232. This chamber 230 is designed to allow a fluid to flow therethrough. An aperture 234 is formed in side wall 212 at center axis 232 that extends completely through side wall 212 between interior surface 220 and exterior surface 218. It is through this aperture 234 that core 132 is received, as explained in more detail below. In some embodiments, an aperture 236 is formed in side wall 214 opposite aperture 234 that extends completely through side wall 214. In these embodiments, aperture 236 is generally aligned with aperture 234 along the center axis 232 of chamber 230 so that a shaft, such as core 132, can pass therethrough.

As shown in FIG. 6, perimeter wall 216 also has an inlet port 238 and a spaced apart outlet port 240 formed therein extending all the way through perimeter wall 216 between interior surface 228 and exterior surface 226. It is through inlet port 238 and outlet port 240, respectively, that fluid enters into and exits from chamber 230. A drain port 242 is also formed in perimeter wall 216 that extends through the wall. Drain port 242 is included to allow water to drain from chamber 230. As such, drain port 242 is positioned in perimeter wall 216 so that drain port 242 is positioned at the bottom of casing 206 when casing 206 has been installed in a vehicle.

Extending away from casing 206 in generally opposite directions, fluid inlet 208 and fluid outlet 210 are used to fluidly couple with separate external fluid lines and provide a fluid pathway between the external fluid lines. In addition, for an impulse type of turbine, such as a Pelton turbine, fluid inlet 208 can be configured to increase the pressure of the fluid that passes therethrough. In the depicted embodiment, fluid will flow from the fluid line connected to the fluid inlet 208, through the chamber 230, and out through the fluid line connected to the fluid outlet 210, as depicted by arrows 244 and 246.

Fluid inlet 205 comprises an inlet tube 248 having an outer surface 250 and an opposing inner surface 252, the tube 248 extending between a first end 254 and a spaced apart second end 256. The inner surface 252 of inlet tube 248 bounds a fluid pathway 258 that extends all the way through fluid inlet 208 between a first opening 260 at first end 254 and a second opening 262 at second end 256. As depicted, fluid pathway 258 bounded by fluid inlet 208 tapers between first end 254 and second end 256 such that second opening 262 is smaller than first opening 260. This tapering increases the pressure of the fluid as it passes through the fluid inlet 208. It is appreciated that in alternative embodiments, fluid pathway 258 is substantially straight, such as when using a reaction type of turbine, such as a Francis turbine.

Returning to FIG. 4 in conjunction with FIG. 6, first end 254 of inlet tube 248 is formed as a coupler 264 as is known in the art to allow a standard fluid line, such as a windshield washer fluid line 176 or 378 (shown in FIG. 1), for example, to fluidly couple therewith. To form coupler 264, outer surface 250 is tapered at first end 254 and caused to flair out axially to a projection 266 that encircles tube. On the other side of projection 266, a portion 268 of inlet tube 248 narrows, causing a shoulder 270 facing away from first opening 260 to be formed on outer surface 250 at the projection 266. Other types of couplers as are known in the art can alternatively be used.

As shown in FIG. 6, second end 256 of inlet tube 248 is attached to or formed with casing 206 at inlet port 238 so that second opening 262 is aligned with inlet port 238. As a result, an enclosed fluid pathway extends between first opening 260 at first end 254 of fluid inlet 208 and chamber 230 through inlet port 238. Inlet port 238 can be attached to casing 206 by adhesive, welding or other known methods, or can be integrally formed with casing 206 as a single unitary piece.

Fluid outlet 210 comprises an outlet tube 272 having an outer surface 274 and an opposing inner surface 276, the tube 272 extending between a first end 278 and a spaced apart second end 280. The inner surface 276 of outlet tube 272 defines a fluid pathway 282 that extends all the way through fluid outlet 210 between a first opening 284 at first end 278 and a second opening 286 at second end 280. As shown in FIG. 4, fluid outlet 210 curves so that first end 278 and second end 280 are substantially orthogonal to one another. Fluid outlet 210 can alternatively be straight or have first end 278 and second end 280 be positioned at some other angle with respect to each other.

First end 278 of outlet tube 272 can be formed as a coupler similar to the one described above for fluid inlet 208 to allow a standard fluid line to couple therewith. Other types of couplers as are known in the art can alternatively be used. In some embodiments, first end 278 does not have a coupler but is instead integrally connected to a conduit, as described in more detail below.

Returning again to FIG. 6, second end 280 of outlet tube 272 is attached to or formed with casing 206 at outlet port 240 so that second opening 286 is aligned with outlet port 240. In this manner, an enclosed fluid pathway extends between first opening 284 at first end 278 of fluid outlet 210 and chamber 230 through outlet port 240. Similar to inlet port 238, outlet port 240 can be attached to casing 206 by adhesive, welding or other known methods, or can be integrally formed with casing 206 as a single unitary piece.

When housing 202 is completely assembled, a fluid pathway exists therethrough, as indicated by arrows 244 and 246, in which a fluid can be received within first opening 260 of fluid inlet 208, flow through fluid inlet 208 and into chamber 230, flow out of chamber 230 through fluid outlet 210 and exit housing 202 through first opening 284 of fluid outlet 210.

Returning to FIG. 5 in conjunction with FIG. 6, rotor assembly 204 is rotatably disposed within chamber 230 and is configured to rotate about a center point 300 that is aligned with center axis 232. Rotor assembly 204 is designed to rotate in a direction shown by arrow 301 when fluid flows through housing 202 in the direction of arrows 244 and 246. Rotor assembly 204 comprises a rotor 302 having a shaft (not shown) extending therefrom or an opening 306 for a shaft to be inserted therein. The rotor 302 can be configured to rotate about bearings disposed thereon, or can have a bearing-less rotation mechanism, such as by using a fluid bearing, as is known in the art. Rotor 302 comprises a generally circular main disk 308 having a plurality of spaced apart blades 310 extending radially outward therefrom.

Main disk 308 has a first surface 312 and an opposing second surface 314. An aperture 316 is formed within main disk 308 about center point 300. Aperture 316 extends completely through main disk 308 between first and second surfaces 312, 314 and is aligned with center axis 232 of side walls 212 and 214 when disposed within chamber 230. Aperture 312 is shaped so that small portion 141 of core 132 will fit therein and will rotate when rotor 302 rotates. As such, aperture 312 can be circular, oval, square, star shaped, or other symmetrical or non-symmetrical shape to match core 132.

As shown in FIG. 6 and noted above, blades 310 extend radially outward from main disk 308. Each blade 310 extends from main disk 308 to a distal end 318 freely disposed radially away from main disk 308. Rotor 302 is designed so that the distal end 318 of each blade 310 is close to, but not touching, interior surface 228 of perimeter wall 216. Blades 310 can be substantially flat, curved, or cup-shaped. For example, in the depicted embodiment, blades 310 are cup-shaped as is known in Pelton turbines. Other shapes are also possible.

Figure 7:
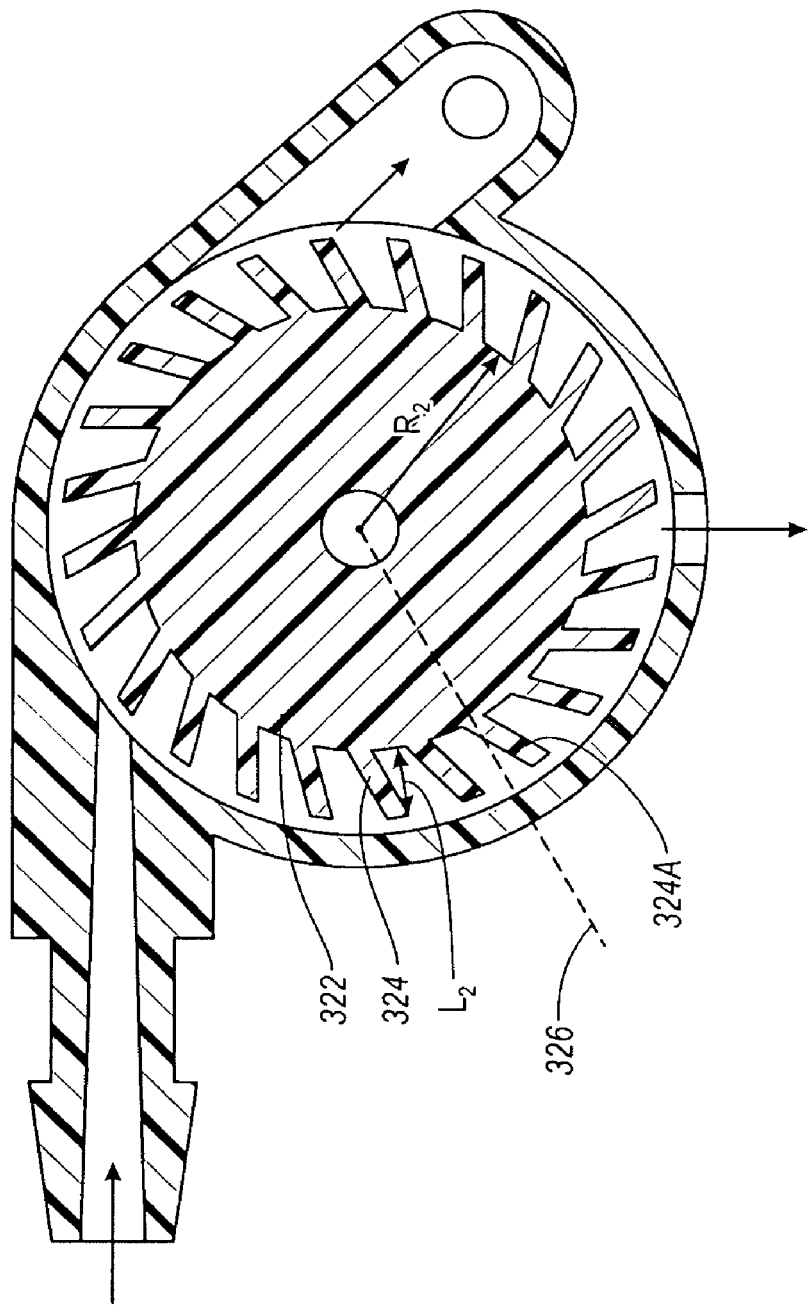
FIG. 7 is a cross-sectional side view of the turbine shown in FIG. 6 showing an alternative embodiment of a rotor used therein.

Various configurations of rotors can be used with the present invention. For example, in the embodiment shown in FIG. 6, radius R1 of main disk 308 is approximately equal to the length L1 of each blade 310, and each blade 310 extends away from main disk 308 along a different straight radial line drawn through the center point 300 (see, e.g., blade 310A and line 320). In an alternative embodiment shown in FIG. 7, the radius R2 of main disk 322 is much larger than the length L2 of each blade 324 and each blade 324 extends away from main disk 322 at an angle to the radial line (see, e.g. blade 324A and line 326). Other configurations can also be used.

Rotor 302 can be comprised of hard plastic, metal or the like. Blades 310, 324 and main disk 308 or 322 can be formed of the same material or of different materials.

As noted above, scrubbing element 130 is attached to turbine 200a so that turbine 200a can cause scrubbing element 130 to rotate. Returning to FIG. 5, this is accomplished by inserting small portion 141 of core 132 through aperture 234 in side wall 212 and into aperture 316 in rotor 302 so as to form the shaft of rotor assembly 204. If a second turbine 200b is used, small portion 143 on the other end of core 132 is also inserted in like manner into the second turbine 200b. Core 132 can be rigidly attached to rotor 302 by being glued, welded, or the like. Alternatively, core 132 and aperture 316 can be shaped so as to cause core 132 to rotate without being rigidly fastened to rotor. For example, core 132 and aperture can have matching non-circular cross-sectional shapes, such as a square, star, or the like.

If rotor assembly 204 includes a shaft connected to main disk 308 of rotor 302, core 132 can be attached to the shaft so as to rotate with the shaft.

Although the foregoing discussion has been directed to a Pelton turbine, it is appreciated that many other different types of turbines can be used with the present invention. For example, turbine 200 can alternatively comprise a reaction type of turbine, such as a Francis turbine, or a different type of impulse turbine. Furthermore, turbines based on pinwheels, pistons, etc can also be used with the present invention.

To allow scrubbing element 130 to more effectively scrub the windshield, scrubbing assembly 102 can include means for depositing fluid onto the scrubbing member 140 as scrubbing member 140 is rotating. Not only does this increase the effectiveness of the cleaning but it lengthens the life of the scrubbing member 140. To accomplish this, a conduit 330 is used.

Figure 8:
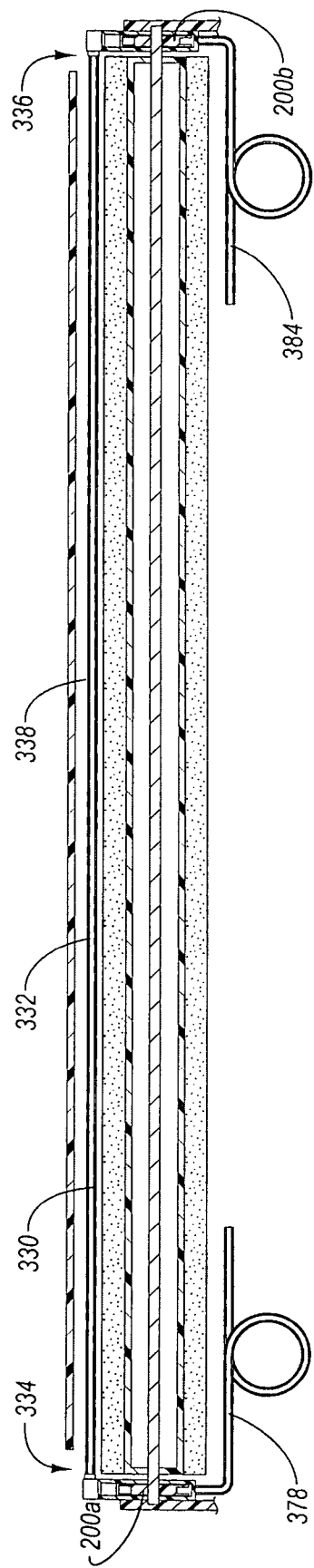
FIG. 8 is a cross-sectional top view of the scrubbing assembly shown in FIG. 1.

Turning to FIG. 8 in conjunction with FIG. 5, conduit 330 comprises an elongated main line 332 extending between a first end 334 and a spaced apart second end 336. As shown in the close-up view of FIG. 5, main line 332 includes an encircling wall 338 that bounds a fluid pathway 340 extending therethrough between the first end 334 and second end 336. First end 334 of main line 332 is connected to fluid outlet 210 of turbine 200a so as to form a fluid connection therewith. If a second turbine 200b is used, second end 336 of main line 332 is also connected to the second turbine, as shown in FIG. 8. Conduit 330 can be attached to fluid outlet 210 or alternatively can be formed therewith. When connected to fluid outlet(s) 210, conduit 330 is positioned so as to be substantially parallel to scrubbing element 130.

As shown in FIG. 5, a plurality of longitudinally spaced apart fluid outlets 342 are formed in wall 338 of conduit 330. Fluid outlets 342 extend all the way through wall 338 so as to allow fluid to exit from fluid pathway 340 and are longitudinally spaced along wall 338 between first and second ends 334, 336. Fluid outlets 342 are substantially radially aligned along wall 338 so as to be positioned in the portion of wall 338 closest to scrubbing element 130. In this manner, when fluid exits conduit 330 through fluid outlets 342, the fluid will be deposited on scrubbing element 130, as depicted by arrows 344.

Figure 9:
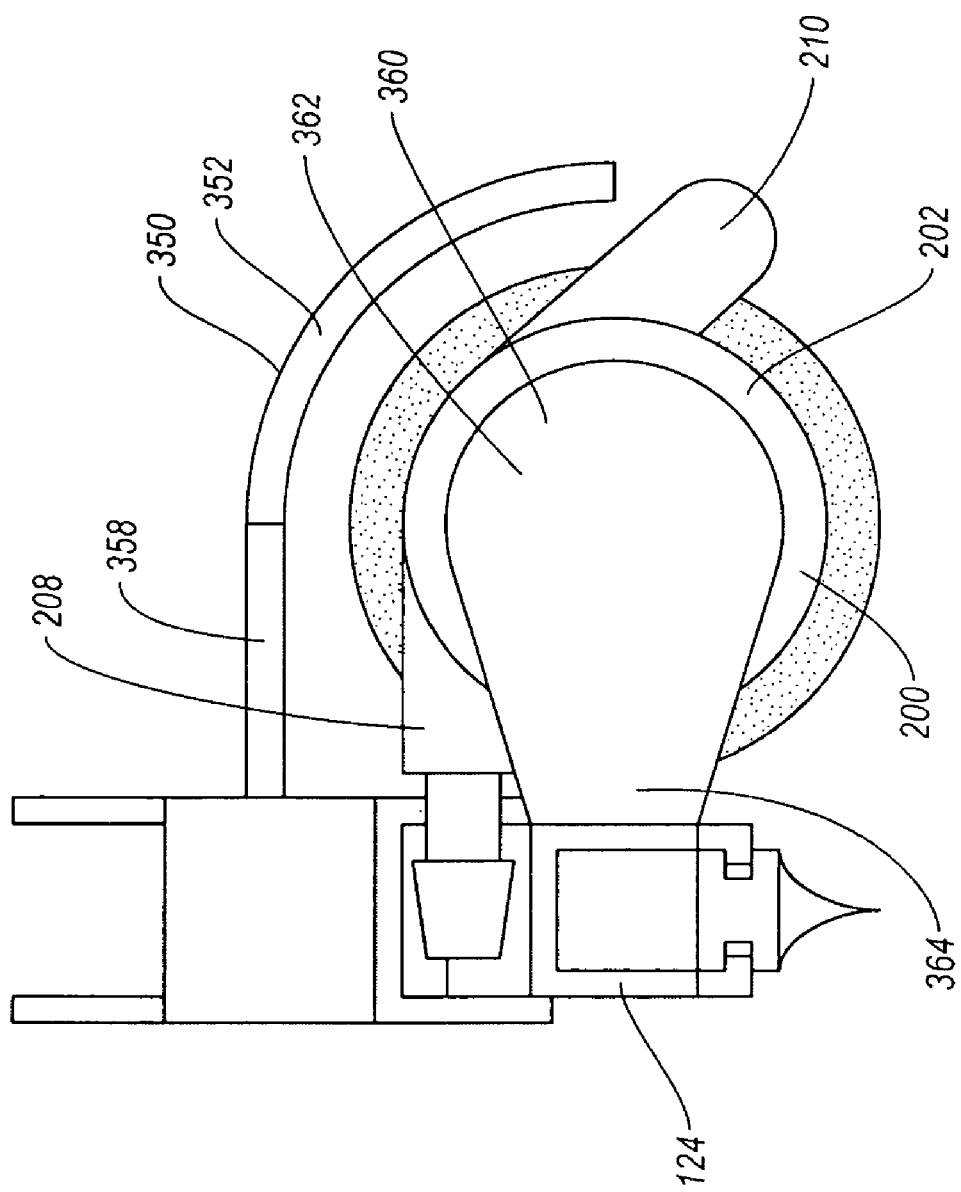
FIG. 9 is a side plan view of the wiper shown in FIG. 1.

To prevent fluid that has been deposited onto scrubbing element 130 from splattering away from scrubbing element, scrubbing assembly can also include a shield 350. Turning to FIG. 9 in conjunction with FIG. 1, shield 350 comprises a thin plate 352 extending between a first end 354 and a spaced apart second end 356. Shield 350 is shaped and positioned so as to extend alongside scrubbing element 130 and conduit 330. As such, shield 352 is generally curved. First and second ends 354, 356 are designed to be positioned adjacent turbines 200. In the depicted embodiment, shield 352 does not extend to turbines 200. In other embodiments shield 352 extends to turbines 200 (see, e.g., FIG. 10). In some of those other embodiments, shield 352 is attached to turbine 200 by adhesive, fasteners, or the like. Shield 350 can be comprised of metal, plastic, or other like materials.

Extending from thin plate 352 at or near the midpoint thereof is an extension 358. Extension 358 is designed to extend to and contact wiper housing 108 so as to provide stability to shield 350. In some embodiments, extension 358 is attached to wiper housing 108 using adhesive, fasteners, or the like.

Scrubbing assembly 102 can be formed directly with windshield wiper assembly 104 or attached therewith by a number of different means. For example, in the depicted embodiment an end cap 360 extends from a first portion 362 disposed at turbine 200 to a second portion 364 disposed at cross arm 120. First portion 362 of end cap 360 attaches to housing 202 of turbine 200 by adhesive, fastener, or the like. Alternatively, end cap 360 can be integrally formed with turbine 200. Similarly, second portion 364 of end cap 360 attaches to first end 124 of cross arm 120 by adhesive, fastener, or the like. Alternatively, end cap 360 can be integrally formed with cross arm 120. Various means for attaching can include clips, screws, bolts, or any combination thereof. Other means of attaching can alternatively be used.

Returning to FIG. 1, as noted above a washer fluid line 176 typically extends down wiper arm 106 from the vehicle to spray washer fluid onto the windshield. Washer fluid line 176 is fluidly coupled to the vehicle washer pump so as to receive washer fluid from the washer pump. To provide fluid to the turbine, a coupler 370 is provided. Coupler 370 is of a type known in the art, which comprises a fluid inlet 372 and a first fluid outlet 374. If two turbines are used in scrubbing assembly 102, coupler 370 further includes a second fluid outlet 376. Automobile fluid line 176 is fluidly connected to fluid inlet 372.

A fluid line 378 is provided that extends from a first end 380 to a spaced apart second end 382. First end 380 of fluid line 378 is fluidly connected to first fluid outlet 374 and second end 382 is fluidly connected to coupler 264 of fluid inlet 208 of turbine 200a so as to provide a fluid path between coupler 370 and turbine 200a. If a second turbine is used, a second fluid line 384 is similarly connected between second fluid outlet 376 and coupler 264 of fluid inlet 208 of turbine 200b. In some embodiments, fluid line 378 can be coiled (see, e.g. FIG. 8) so as to provide additional line when needed.

Figure 10:
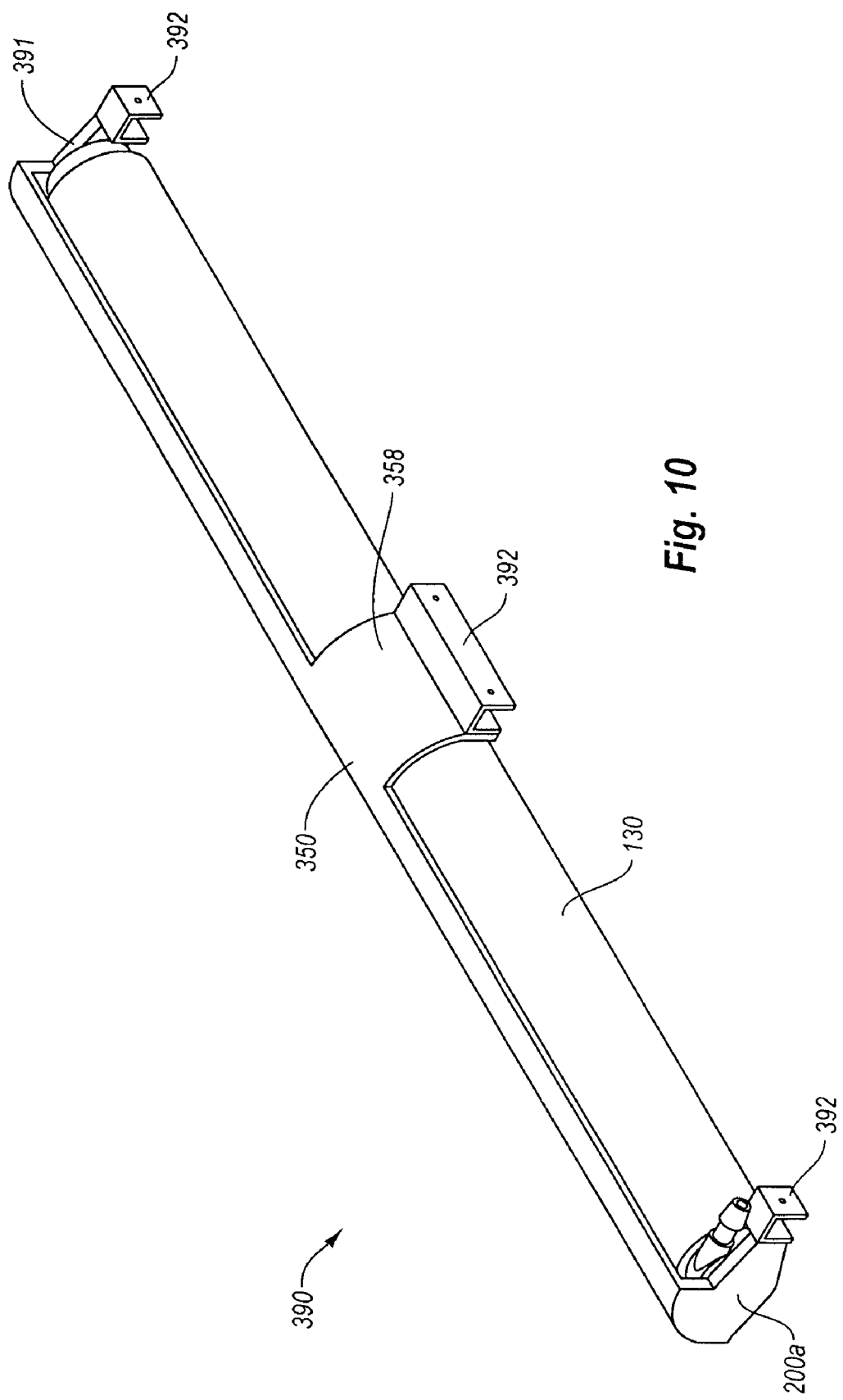
FIG. 10 is a rear perspective view of a detachable scrubbing assembly according to one embodiment of the present invention.

In some embodiments, scrubbing assembly is removably detachable from the windshield wiper assembly. For example, FIG. 10 shows a scrubbing assembly 390 designed to be removably attached to a standard windshield wiper known in the art. Scrubbing assembly 390 includes scrubbing element 130, turbine 200a, and shield 350 similar to those used in scrubbing assembly 102. Note, however, that scrubbing assembly 390 only has one turbine 200a; a simple bracket 391 is disposed at the opposite end of scrubbing assembly 390 to allow scrubbing element 130 to rotate.

Furthermore, scrubbing assembly 390 includes mounting brackets 392 attached to or formed with turbine 200a, bracket 391 (or turbine 200b if used), and extension 358 of shield 350. To attach scrubbing element 130 to a standard windshield wiper, brackets 392 are positioned over and/or around cross arms 120, 122 and/or main cross-member 112 of the wiper assembly 104. Brackets 392 can be designed to clip on wiper assembly 104 or be screwed or bolted into place. Other means of attaching brackets 392 to wiper assembly 104 can also be used.

Figure 11:
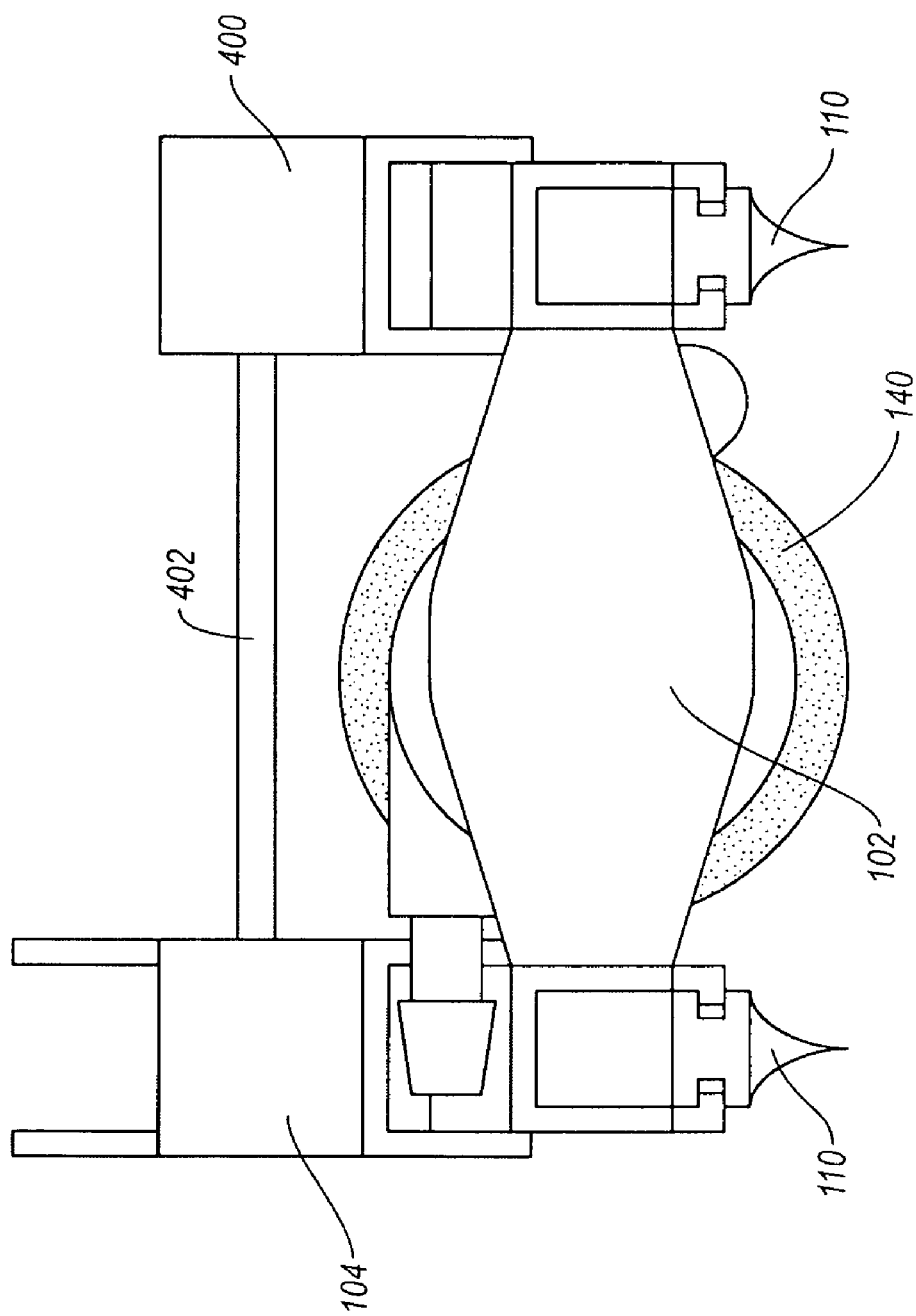
FIG. 11 is a side plan view of a wiper according to one embodiment of the present invention.

FIG. 11 shows an alternative embodiment in which a second windshield wiper assembly 400 is added to the wiper. Second windshield wiper assembly 400 is substantially similar to wiper assembly 102 except that wiper assembly 400 does not attach to a wiper arm 106. Instead, wiper assembly 400 attaches to wiper assembly 104 via a connecting arm 402 such that wiper blades 110 of both wiper assemblies 102 and 400 can contact the windshield. Scrubbing assembly 102 is disposed between windshield wiper assemblies 102 and 400. A second windshield wiper assembly may be useful when using a scrubbing element that contacts the windshield during both directions of the wiper stroke or when the washer fluid otherwise coats the window excessively. This arrangement allows the windshield to be wiped dry by each of the blades 110 after the scrubber member 140 scrubs the windshield during both directions of wiper movement.

A windshield wiper 100 according to the present invention can be used to replace a standard windshield wiper that is currently on a vehicle. To do this, the old wiper is removed from the wiper arm 106 in the standard manner. The new wiper 100 with the scrubbing assembly 102 is then installed, in the standard manner of wiper installation. Alternatively, an attachable scrubbing assembly 390 can simply be attached to the existing wiper using brackets 391 (see FIG. 10). To provide fluid to the turbine(s) 200, the existing washer fluid line 176 of the vehicle is connected to fluid inlet 372 of coupler 370 in a standard manner. Washer fluid line 176 may need to be cut to provide an end portion that can connect to fluid inlet 372.

Once installed, windshield wiper 100 can be operated similar to a standard wiper. The vehicle operator uses the wiper controls to move the wiper back and forth across the windshield in the normal manner. When the operator desires to activate the scrubbing action of the scrubbing assembly, the operator activates the washer fluid line in the normal manner. This causes washer fluid to flow through washer fluid line 176, through coupler 370, fluid line 378 and into fluid inlet 208 of turbine 200a in the direction shown by arrow 244 (see FIG. 6). As the fluid passes through chamber 230 of turbine 200a, the fluid pressure of the moving fluid creates a force on blades 310. This force causes rotor 302 to spin about center point 300 in the direction of the fluid flow. By virtue of core 132 being received within aperture 316, scrubbing element 130 is also forced to rotate about its central longitudinal axis 138. The scrubbing member 140 is forced against the windshield as scrubbing element 130 rotates, thus providing the scrubbing action.

After the washer fluid passes through chamber 230, the fluid exits turbine 200a through fluid outlet 210 and enters fluid pathway 340 at the first end 334 of conduit 330. The fluid exits pathway 340 of conduit 330 through the plurality of fluid outlets 342 as shown by arrows 344 (see FIG. 5). Due to the positioning of fluid outlets 342, the fluid that exits conduit 330 becomes deposited on scrubbing element 130 as scrubbing element 130 rotates. The fluid moistens scrubbing element 130 and aids in cleaning the windshield.

If a second turbine 200b is used, washer fluid also passes through fluid line 380 and into turbine 200b, where rotor 302 is also caused to spin and provide a second rotating force for scrubbing element 130. Similar to the fluid in turbine 200a, the fluid that flows through turbine 200b also enters the fluid pathway 340 of conduit 330, but at the second end 336. The fluid then exits conduit 330 in the same manner as described above.

When the operator deactivates the washer fluid line in the normal manner inside the vehicle, the fluid stops flowing. Because of this, the rotor 302 and the scrubbing element 130 that is attached thereto, stop rotating. In some embodiments the scrubbing member stops contacting the windshield. Also, because no fluid is flowing from the vehicle's fluid line 176, no fluid deposits on scrubbing element 130.

FIGS. 12 and 13 show a scrubbing assembly 410 according to an alternative embodiment of the present invention. As shown in FIG. 12, instead of having a turbine disposed in-line with the scrubbing element, scrubbing assembly 410 comprises a turbine 412 that is positioned above and transverse to a scrubbing element 414. Similar to previously described embodiments, turbine 412 includes a rotor 416 that rotates about a rotational axis 418. However, instead of rotor 416 directly driving the scrubbing element 414, turbine 412 is configured so that rotor 416 indirectly drives scrubbing element 414. To facilitate this, a connecting rod 420 extends away from rotor 416 along axis 418 to a distal end 422 so as to project away from turbine 412. A first bevel gear 424 is disposed on the distal end 422 of connecting rod 420. First bevel gear 424 forms a substantially conical or frustoconical shape and is formed on connecting rod 420 or attached thereto. First bevel gear 424 has a beveled thread 426 that encircles the gear. As rotor 416 rotates about axis 418, first bevel gear 424 also rotates about axis 418 by virtue of its connection to connecting rod 420.

To be able to transfer the rotational force imposed on first bevel gear 424 by rotor 416 to the transverse rotational force required to rotate scrubbing element 414, a mating second bevel gear 428 is included on scrubbing element 414. Second bevel gear 428 encircles core 429 and has a beveled threaded surface 430 that mates with beveled thread 426 of first bevel gear 424. Beveled gears 424 and 428 are configured so that second bevel gear 428 will be caused to rotate about a rotational axis 432 that is substantially orthogonal to the rotational axis 418 of the first bevel gear 424. This rotational axis 432 corresponds to the rotational axis of the scrubbing element 414. Thus, in operation, as first bevel gear 424 rotates, core 429 also rotates by virtue of the second bevel gear 428 connected thereto.

Using the beveled gear approach yields various benefits. For example, when using the beveled gears, rotor 416 of turbine 412 is not required to be in line with core 429. As such, rotor 416 can be positioned further away from the windshield 174 and can have a larger diameter than rotor 302 that is directly attached to the core. This results in larger torque being applied to the connecting rod 420 which, in turn, produces larger torque on the scrubbing assembly 410. Furthermore, the amount of space required for the bevel gears 424 and 428 along the length of scrubbing assembly 410 is typically much less than that required for the turbine itself. As a result, it is easier to position the turbine 412 midway between the ends of the scrubbing assembly 410, than with the previously described turbines.

As shown in FIGS. 12 and 13, a shield 434 can be used to prevent any portion of scrubbing member 436 of the scrubbing element 414 from getting caught in the bevel gears 424 and 428. Shield 434 is rigidly attached to the turbine casing and extends down therefrom so as to cover the connecting rod 420 and a portion of the bevel gears 424 and 428. Because of its rigid connection to the turbine casing, the shield 434 does not rotate with the scrubbing element 14 during use. As such, shield 434 protects the connecting rod 420 and the bevel gears 424 and 428.

As shown in the depicted embodiment, shield 434 can be configured to cause the scrubbing member 436 to separate and not contact the bevel gears 424 and 428 towards the upper portion of the gear interconnection, but still allow the scrubbing member 436 to come together where the scrubbing element 414 contacts the windshield 174. In this manner, there is no missing scrubbing coverage on the windshield 174 due to the bevel gears 424 and 428. In such embodiments, the scrubbing member 436 can be comprised of fibers, filaments, or other type of scrubbing member that is easily moved laterally.

Figure 14:
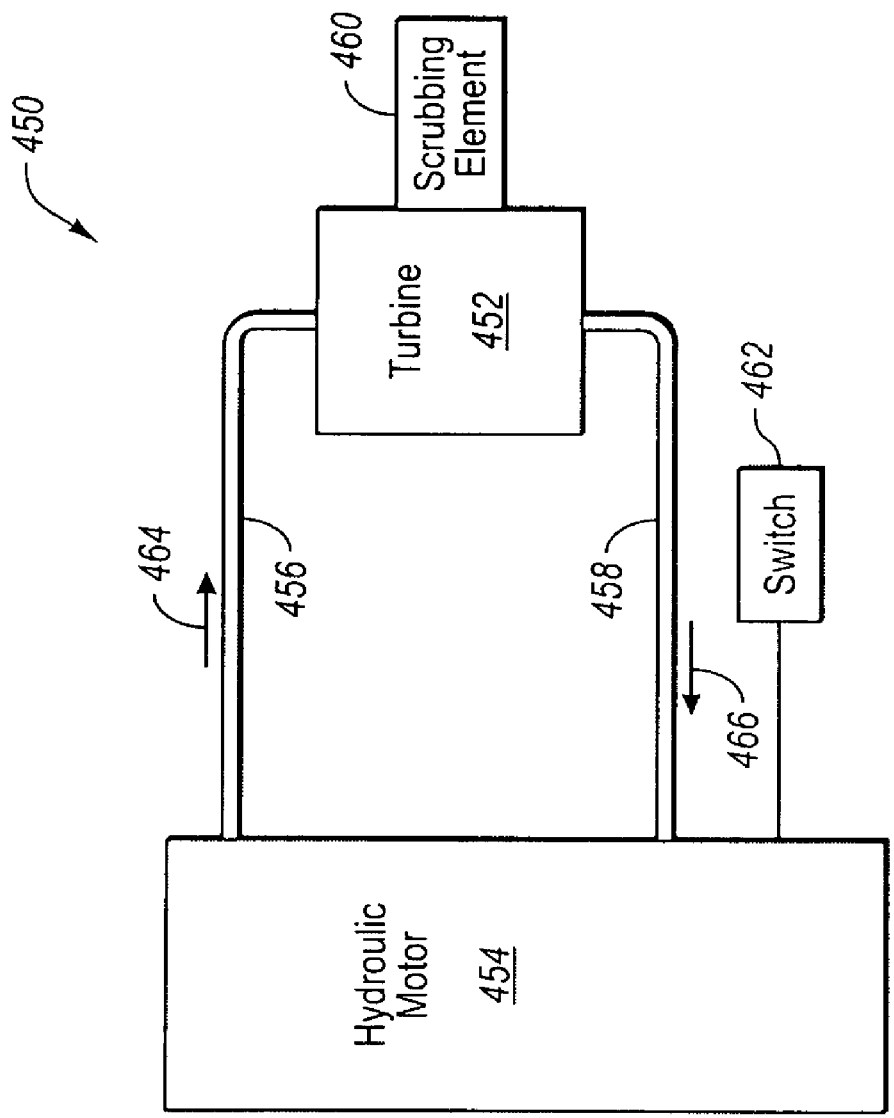
FIG. 14 is a block diagram of a scrubbing assembly according to another embodiment of the present invention in which the turbine is driven by a hydraulic motor.

FIG. 14 shows another alternative embodiment of a scrubbing assembly 450. In this embodiment, instead of using washer fluid to rotate the rotor of the turbine, hydraulic fluid is used to spin the rotor of a turbine 452 in a closed-loop system. To do this, a hydraulic motor 454 as is known in the art is mounted to the vehicle, either in the engine compartment or another location. Hydraulic fluid lines 456 and 458 are connected between the hydraulic motor 454 and the turbine 452 in a closed-loop fashion. A scrubbing element 460 is connected to the turbine 452 in a similar manner to that described above.

When the vehicle operator desires to have the scrubbing element 460 scrub the windshield 174, the operator activates a switch 462 located within the vehicle. This causes the hydraulic motor 454 to activate, forcing hydraulic fluid through one of the fluid lines 456 in the direction denoted by arrow 464 to circulate through the turbine 452. The hydraulic fluid passes through the turbine 452 so as to cause the rotor to turn, similar to previous embodiments. The fluid is then returned to the hydraulic motor through the other fluid line 458 in the direction denoted by arrow 466 to be recirculated in the closed-loop system.

The invention as described herein provides many benefits to a vehicle operator. The wiper as described herein can easily replace an existing wiper on the vehicle with minimum installation effort. No electrical wiring changes are required and the scrubbing mechanism of the inventive wiper can be activated simply by activating the wiper fluid line in the vehicle. Furthermore, the turbines used to rotate the scrubbing element are relatively inexpensive and easily replaceable. Moistening the rotating scrubbing element with the washer fluid will extend the life of the scrubbing elements further decreasing costs.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A windshield wiper comprising:
    a first wiper assembly comprising a first wiper blade attached to a first wiper housing; and
    a scrubbing assembly attached to the first wiper housing, the scrubbing assembly comprising:
        a scrubbing element having a central longitudinal axis;
        a first turbine attached to the scrubbing element, the first turbine being fluidly coupled with a washer fluid line of a vehicle and to rotate the scrubbing element about the central longitudinal axis when washer fluid flows through the first turbine; and
        a conduit fluidly coupled to the first turbine, the conduit being configured to deposit the washer fluid onto the scrubbing member after the washer fluid has passed through the turbine.

2. The windshield wiper recited in claim 1, wherein the scrubbing assembly further comprises a shield that covers at least a portion of the scrubbing element and at least a portion of the conduit.

3. The windshield wiper recited in claim 1, wherein the scrubbing assembly further comprises a second turbine attached to the scrubbing element, the second turbine being configured to fluidly couple with the washer fluid line of the vehicle and to rotate the scrubbing element about the central longitudinal axis when wiper fluid flows through the second turbine.

4. The windshield wiper recited in claim 1, further comprising a second wiper assembly having a second wiper blade attached to a second wiper housing, wherein the scrubbing assembly is at least partially disposed between the first wiper assembly and the second wiper assembly and the second wiper assembly is attached to the first wiper assembly or to the scrubbing assembly.

5. The windshield wiper recited in claim 1, wherein the scrubbing assembly is detachable from the first wiper housing.

6. A windshield wiper comprising:
    a first wiper assembly comprising a first wiper blade attached to a first wiper housing; and
    a scrubbing assembly attached to the first wiper housing, the scrubbing assembly comprising:
        a scrubbing element extending between a first end and a spaced apart second end, the scrubbing element comprising a scrubbing member formed about or attached to a core, the core extending along a central longitudinal axis of the scrubbing element;
        a first turbine attached to the core of the scrubbing element and being fluidly coupled with a washer fluid line of a vehicle to rotate the scrubbing element about the central longitudinal axis when washer fluid flows therethrough, the first turbine comprising:
            a first fluid inlet;
            a first fluid outlet; and
            a rotatable first rotor, the first rotor being configured to rotate when the washer fluid flows through the first turbine between the first fluid inlet and the first fluid outlet; and
        a conduit fluidly coupled to the first fluid outlet of the first turbine, the conduit extending alongside at least a portion of the scrubbing element and configured to deposit the washer fluid onto the scrubbing member.

7. The windshield wiper recited in claim 6, wherein the scrubbing member comprises at least one of a foam pad, a mesh netting, a chamois and a cloth.

8. The windshield wiper recited in claim 6, wherein the scrubbing member comprises bristles extending substantially radially from the core.

9. The windshield wiper recited in claim 8, wherein the bristles are substantially u-shaped.

10. The windshield wiper recited in claim 6, wherein the core of the scrubbing element is connected to the first rotor of the first turbine.

11. The windshield wiper recited in claim 6, wherein the scrubbing assembly further comprises a coupler fluidly coupled with the first inlet of the first turbine, the coupler being configured to couple with the washer fluid line of a vehicle.

12. The windshield wiper recited in claim 6, wherein the first rotor comprises a plurality of blades.

13. The windshield wiper recited in claim 6, wherein the conduit comprises a main line and a plurality of fluid outlets spaced apart along the main line.

14. The windshield wiper recited in claim 6, further comprising a shield attached to at least one of the first turbine and the first wiper housing, the shield extending alongside at least a portion of the scrubbing element and covering at least a portion of the conduit.

15. The windshield wiper recited in claim 6, wherein the scrubbing assembly further comprises a second turbine configured to rotate the scrubbing element about the central longitudinal axis.

16. The windshield wiper recited in claim 15, wherein the first turbine is attached to the core at the first end of the scrubbing element and the second turbine is attached to the core at the second end of the scrubbing element.

17. The windshield wiper recited in claim 15, wherein the second turbine comprises:

a second fluid inlet;
a second fluid outlet; and
a rotatable second rotor, the second rotor being configured to rotate when fluid flows through the second turbine between the second fluid inlet and the second fluid outlet.

18. The windshield wiper recited in claim 17, wherein the core of the scrubbing element attaches to the first rotor of the first turbine and to the second rotor of the second turbine.

19. The windshield wiper recited in claim 17, wherein the scrubbing assembly further comprises a coupler fluidly coupled with the fluid inlets of the first and second turbines, the coupler being configured to couple with the washer fluid line of a vehicle.

20. The windshield wiper recited in claim 17, wherein the conduit also fluidly couples to the second fluid outlet of the second turbine.

21. The windshield wiper recited in claim 20, further comprising a shield extending alongside at least a portion of the scrubbing element and covering at least a portion of the conduit, the shield being attached to at least one of the first turbine, the second turbine, and the first wiper housing.

* * * * *